United States Patent
Dzialakiewicz et al.

(10) Patent No.: US 7,070,162 B2
(45) Date of Patent: Jul. 4, 2006

(54) VALVE ACTUATING APPARATUS

(75) Inventors: Paul Dzialakiewicz, South Bend, IN (US); Donald Sack, Granger, IN (US); Peter G Hutchings, Granger, IN (US)

(73) Assignee: South Bend Controls, Inc., South Bend, IN (US)

( * ) Notice: Subject to any disclaimer, the term of this patent is extended or adjusted under 35 U.S.C. 154(b) by 128 days.

(21) Appl. No.: 10/622,256

(22) Filed: Jul. 18, 2003

(65) Prior Publication Data
US 2005/0012060 A1  Jan. 20, 2005

(51) Int. Cl.
*F16K 31/02* (2006.01)
(52) U.S. Cl. ............................. 251/129.08; 251/129.17
(58) Field of Classification Search ........... 251/129.01, 251/129.02, 129.08, 129.15, 129.17; 137/625.44
See application file for complete search history.

(56) References Cited

U.S. PATENT DOCUMENTS

| | | | |
|---|---|---|---|
| 3,423,062 A | 1/1969 | Grayson | |
| 3,796,229 A | 3/1974 | Wright | |
| 3,960,361 A | 6/1976 | York | |
| 4,349,045 A | 9/1982 | Kah, Jr. | |
| 4,527,590 A | 7/1985 | Kolze | |
| 4,986,308 A | 1/1991 | Champseaux | |
| 5,027,857 A | 7/1991 | Champseix | |
| 5,199,462 A | 4/1993 | Baker | |
| 5,653,422 A | 8/1997 | Pieloth et al. | |
| 5,762,097 A | 6/1998 | Hettinger et al. | |
| 5,799,696 A | 9/1998 | Weiss | |
| 5,983,941 A | 11/1999 | Fritz et al. | |
| 6,262,498 B1 | 7/2001 | Leiber | |
| 6,325,354 B1 | 12/2001 | Hoen et al. | |
| 6,394,136 B1 | 5/2002 | Rohrbeck | |
| 6,460,558 B1 | 10/2002 | Anderson | |
| 6,484,754 B1 | 11/2002 | Muth et al. | |
| 2002/0067100 A1 | 6/2002 | Rieck et al. | |
| 2003/0226601 A1 | 12/2003 | Frisch | |

FOREIGN PATENT DOCUMENTS

| | | |
|---|---|---|
| EP | 1316749 A2 | 6/2003 |
| JP | 7063273 A2 | 3/1995 |
| WO | WO 00/03166 | 1/2000 |

*Primary Examiner*—Justine R. Yu
*Assistant Examiner*—Peter deVore
(74) *Attorney, Agent, or Firm*—Baker & Daniels LLP

(57) ABSTRACT

A valve actuating apparatus for control of fluid flow that has a housing having a valve body with a first port and a second port that extend through the housing. In one embodiment the valve actuating apparatus also has a toggle valve assembly that includes an armature, at least one sealing surface connected to the armature, and a spring biasing the armature to a first position where the sealing surface closes the first port. The valve actuating apparatus further includes a solenoid assembly with an electromagnetic coil and a pole piece having a first leg and a second leg. The first leg is shorter than the second, and the first leg and the armature define an air gap when the armature is in the first position. The electromagnetic coil creates a magnetic field in the pole piece when it is electrically energized to attract the armature toward the first leg to a second position where the air gap is reduced.

34 Claims, 11 Drawing Sheets

VALVE ACTUATING APPARATUS

BACKGROUND OF THE INVENTION

This invention relates to a toggle solenoid valve for controlling fluid flow through valve ports, and in particular, to a toggle solenoid valve having an electromagnetic pole piece and toggle assembly.

Solenoid valves commonly utilize either a plunger or a toggle-style assembly for valve actuation. It is believed that the plunger-style solenoids offer good power to force efficiencies but are difficult to design when trying to achieve minimum upsweep or dead volume. Toggle-style valves offer an alternative to minimize the upsweep or dead volume but may sacrifice the power to force efficiencies in the plunger-style solenoid valve.

Toggle-style solenoid valves typically utilize coils which are electromagnetically coupled to a pole piece or a core assembly and a moving armature. The armature is typically displaced or preloaded to a fixed gap using a spring element. The armature is then coupled through a membrane to a valve section typically having three ports: common, normally closed, and normally open. Alternatively, the valve can be configured with only two ports by omitting the center port. The armature serves as a poppet to the valves. Alternatively, the armature may have poppets connected to it. When the coils are energized, the armature moves or rotates to release the valve of the normally closed port and engage the valve on the normally open port. If the assembly includes a common port, the common port will be in communication through a pathway with the normally open port until the coil is energized and the armature moves, whereupon the common port will then be in communication with the normally closed port. It has been known to have the armature pivot around a fixed point when rotating upon actuation.

In a common arrangement, the armature will be biased by a coil spring providing the fixed gap between the armature/poppet and the normally open port and closing the normally closed port as is shown in U.S. Pat. Nos. 5,653,422 and 5,762,097.

It has also been known to provide a toggle-type valve that includes a pair of elastomeric support arms extending from a cover surrounding a rigid core as is shown in U.S. Pat. No. 6,394,136. The '136 Patent also discloses actuation arms, which are attached in a levered manner to the support arms. Moving the actuation arms provides a torque to the support arms for pivoting the toggle valve. The support arms, actuation arms, cover and a frame are all made of elastomeric material. All movement of the valve assembly in the '136 Patent is provided by movement of the actuation arms as opposed to the magnetic attraction of an armature and an opposing spring as shown in the '422 and '097 Patents.

SUMMARY OF THE INVENTION

In one embodiment, the invention includes a valve actuating apparatus for control of fluid flow that has a housing having a valve body with a first port and a second port that extend through the housing. The valve actuating apparatus also has a toggle valve assembly that includes an armature, at least one sealing surface connected to the armature, and a spring biasing the armature to a first position where the sealing surface closes the first port. The valve actuating apparatus further includes a solenoid assembly with an electromagnetic coil and a pole piece having a first leg and a second leg. The first leg is shorter than the second, and the first leg and the armature define an air gap when the armature is in the first position. The electromagnetic coil creates a magnetic field in the pole piece when it is electrically energized to attract the armature toward the first leg to a second position where the air gap is reduced.

When the armature is in the second position, the air gap may be eliminated with the armature in contact with the first leg of the pole portion. A second sealing surface may be included that closes the second port when the armature is in the second position. In this embodiment, the first sealing surface moves away from and opens the first port when the armature moves to the second position.

The valve actuating apparatus may also include a common port that is in communication with the second port when the armature is in the first position and that is in communication with the first port when the armature is in the second position.

The armature may be at least partially enclosed in an encapsulation medium, and the encapsulation medium may include a pair of integrally formed poppets. In one embodiment, one of the poppets is longer than the other, and the longer poppet closes the first port when the armature is in the first position. A diaphragm may be mounted to the poppets so that the diaphragm forms the sealing surface.

The spring may be at least partially encased by the encapsulation medium. The spring may include a pair of torsional force legs and a frame extending from the legs for mounting the spring to the housing.

In another embodiment a valve actuating apparatus for control of fluid flow is provided that includes a housing having a valve body including a first port and a second port that extend through the body. The valve actuating apparatus also has a toggle valve assembly that includes an armature, a first and second poppet connected to and extending from the armature, wherein the first poppet is longer than the second poppet, and a spring biasing the armature to a first position, such that the first poppet closes the first port. The valve actuating apparatus also has a solenoid assembly including an electromagnetic coil and a pole piece, the electromagnetic coil creates a magnetic field in the pole piece when it is electrically energized so as to attract the armature to a second position where the first port is open and the second port is closed. The second poppet may close the second port in the second position.

The valve actuating apparatus may also include a common port that is in communication with the second port when the armature is in the first position and that is in communication with the first port when the armature is in the second position.

The armature of the valve actuating apparatus may be at least partially enclosed in an encapsulation medium, and the poppets may be formed in the encapsulation medium. The valve actuating apparatus may also include a diaphragm mounted to at least one of the poppets to provide sealing surfaces against valve seats on the ports.

The spring of this embodiment may include torsional force legs, and at least a portion of the spring may be encased by the encapsulation medium. The spring may include a frame extending from the legs for securing the spring to the housing.

The pole piece of this embodiment of the valve actuating apparatus may include a first leg and a second leg, the first leg being shorter than the second leg. The armature and the first leg of the pole piece may define an air gap when the armature is in the first position, and the air gap may be reduced when the coil is energized.

An additional embodiment of a valve actuating apparatus for control of fluid flow is provided that includes a housing having a valve body that includes a first port and a second port wherein the ports extend through the housing. The valve actuating apparatus also has a toggle valve assembly that includes an armature, a spring having torsional force legs extending outwardly from the armature, and an encapsulation medium enclosing at least a portion of the armature. The spring provides a torsional force to bias the armature to a first position wherein the first port is closed. The valve actuating apparatus also has a solenoid assembly including an electromagnetic coil and a pole piece, and the electromagnetic coil creates a magnetic field in the pole piece when it is electrically energized to attract the armature to a second position, in which the first port is open.

The encapsulation medium may include a pair of integrally formed poppets, the first poppet being longer than the second poppet. The longer poppet may close the first port in the first position. A diaphragm may be mounted to at least one of the poppets to provide a sealing surface against a valve seat of one of the ports.

The spring may be made of metal alloy and include a frame to secure the spring to the housing.

The pole piece may include a pair of legs with a first leg being shorter than a second leg. The armature and the first leg may define an air gap when the armature is in the first position. The air gap may be reduced when the armature moves to the second position as the coil is energized.

Yet still another embodiment of a valve actuating apparatus for controlling fluid flow is provided that includes a housing having a valve body with a first port and a second port that extend through the housing. The valve actuating apparatus also has a toggle valve assembly with an armature. The armature is moveable between a first position and a second position, and when the armature is in the first position, the first port is closed, and when the armature is in the second position, the first port is open. The valve actuating apparatus also has a solenoid assembly that includes an electromagnetic coil and a pole piece. The pole piece may have a central portion located inside the coil and a pair of legs extending from the central portion with one of the legs being shorter than the other. The armature contacts only one of the legs while in the first position and contacts both of the legs while in the second position.

DETAILED DESCRIPTION OF EMBODIMENTS OF THE INVENTION

Now referring to FIGS. 1–5, a first embodiment of a valve actuating apparatus is designated generally as 10. Valve actuating apparatus 10 includes a housing generally indicated as 12, a solenoid assembly generally indicated as 14 and a toggle valve assembly generally indicated as 16.

Figure 4:
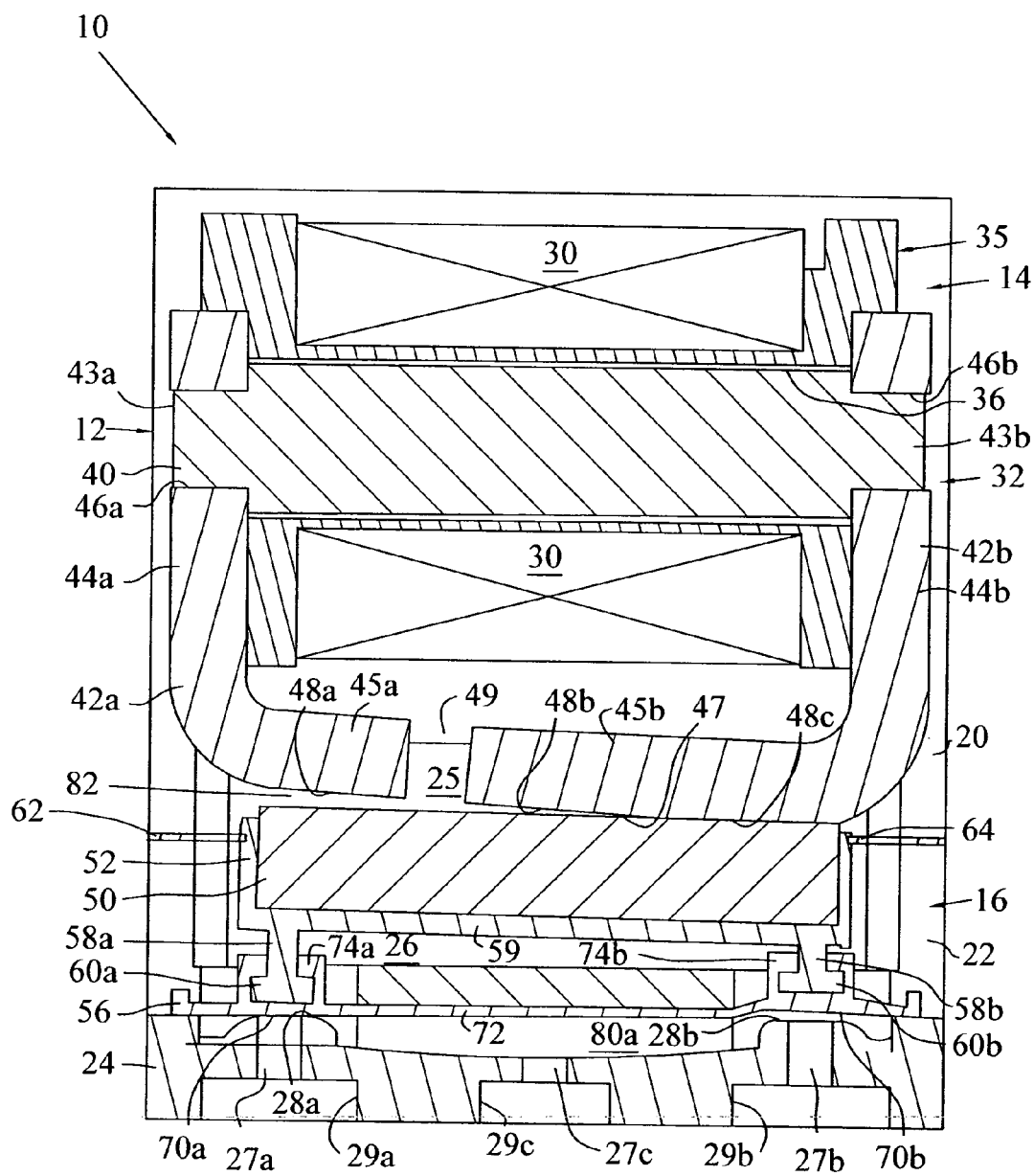
FIG. 4 is a cross-sectional view taken along plane 4—4 of FIG. 1 showing the position of the armature of the valve actuating apparatus when the coil of the solenoid is not energized.
Figure 5:
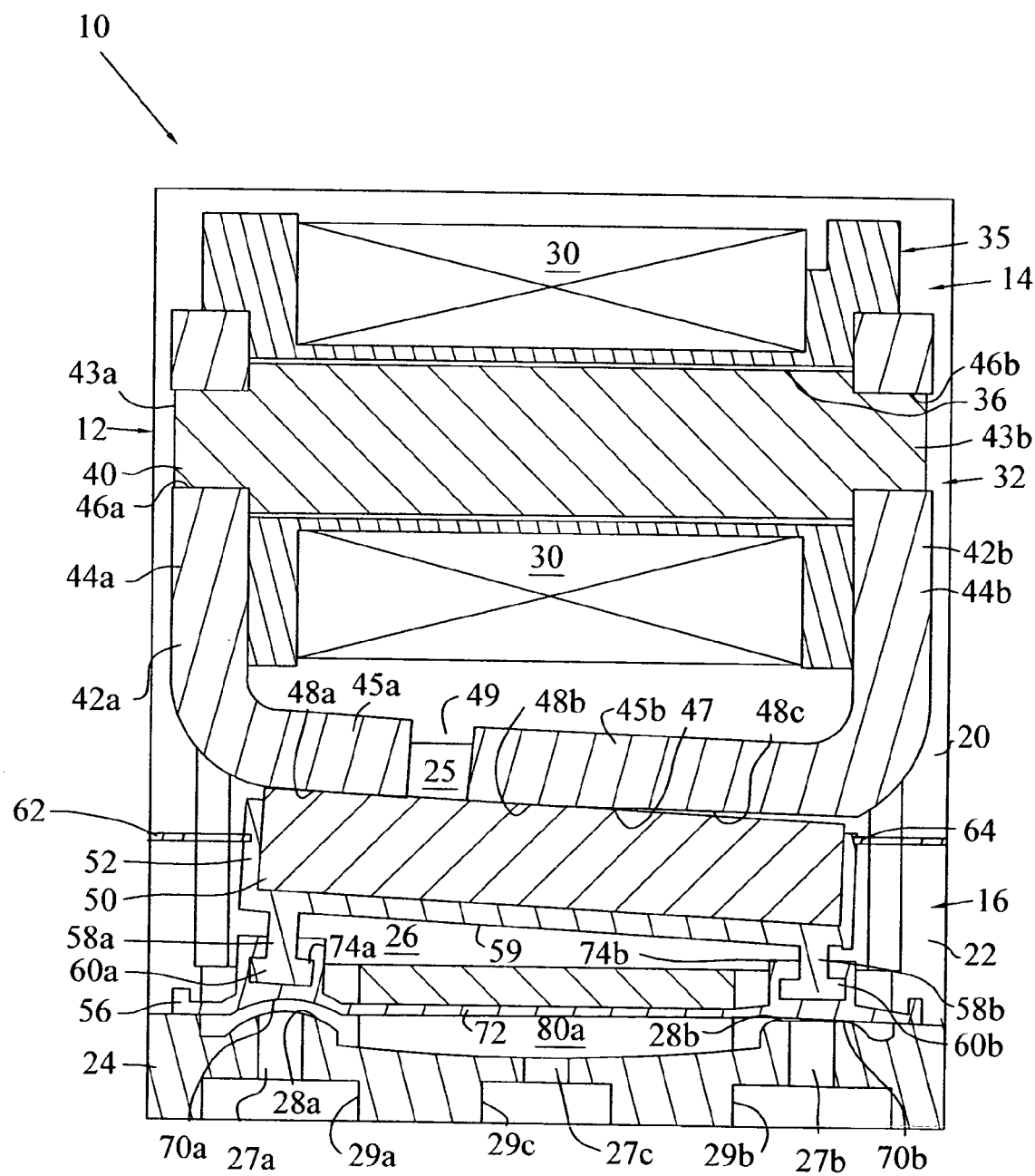
FIG. 5 is a cross-sectional view taken along the same plane as FIG. 4 showing the position of the armature when the coil is energized.

Housing 12 includes an upper portion 20, an intermediate portion 22, and a valve body 24. Referring to FIGS. 4 and 5, the upper portion 20 includes a cavity 25, wherein the solenoid assembly 14 is predominantly located. Intermediate portion 22 has a cavity 26, wherein the toggle valve assembly 16 is predominantly located. The valve body 24 of housing 12 includes three ports or holes 27a, 27b, and 27c for passage of a fluid. Ports 27a and 27b each have a valve seat 28a and 28b, respectively. Ports 27a, 27b, and 27c may also contain counter bores 29a, 29b, and 29c, respectively for receipt of fittings or O-rings to connect conduits (not shown) to carry a fluid (not shown) to and from the valve body.

Figure 1:
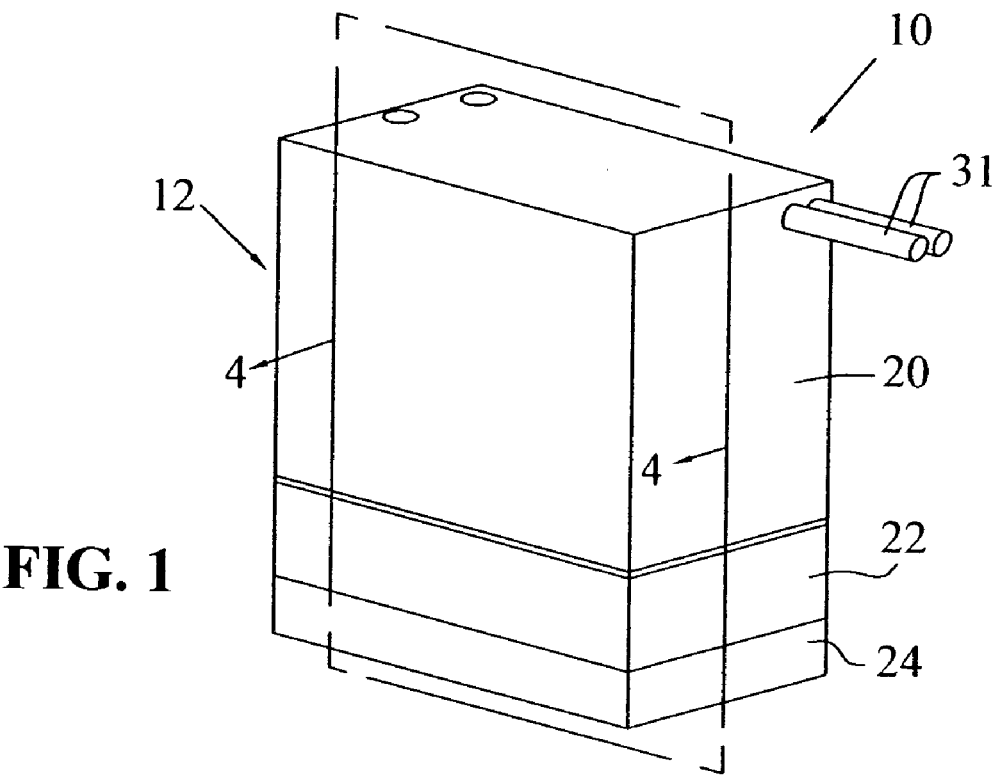
FIG. 1 is a perspective view of one embodiment of a valve actuating apparatus according to the present invention.
Figure 2:
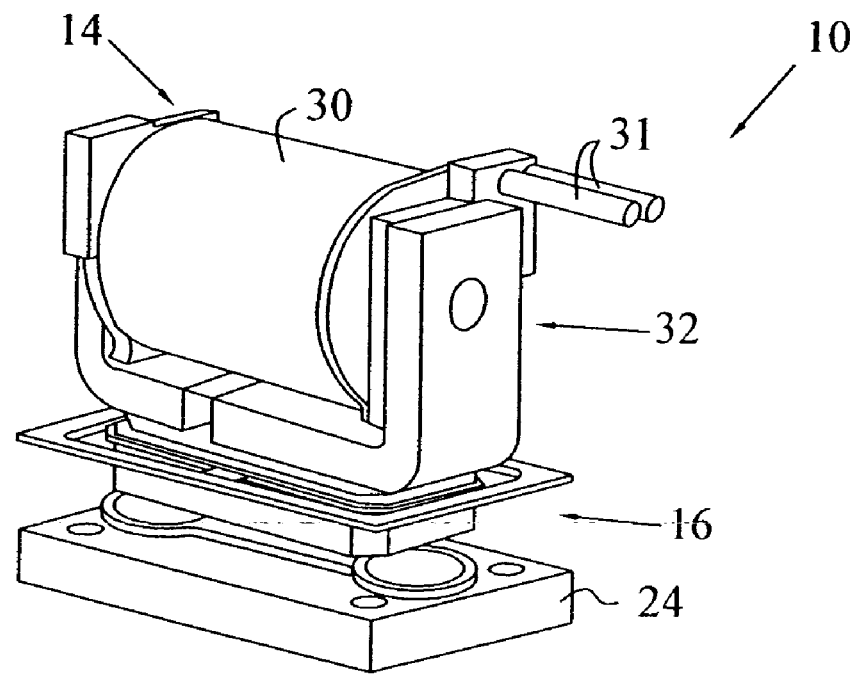
FIG. 2 is a perspective view of the valve actuating apparatus of FIG. 1 with the upper portions of the housing removed.
Figure 3:
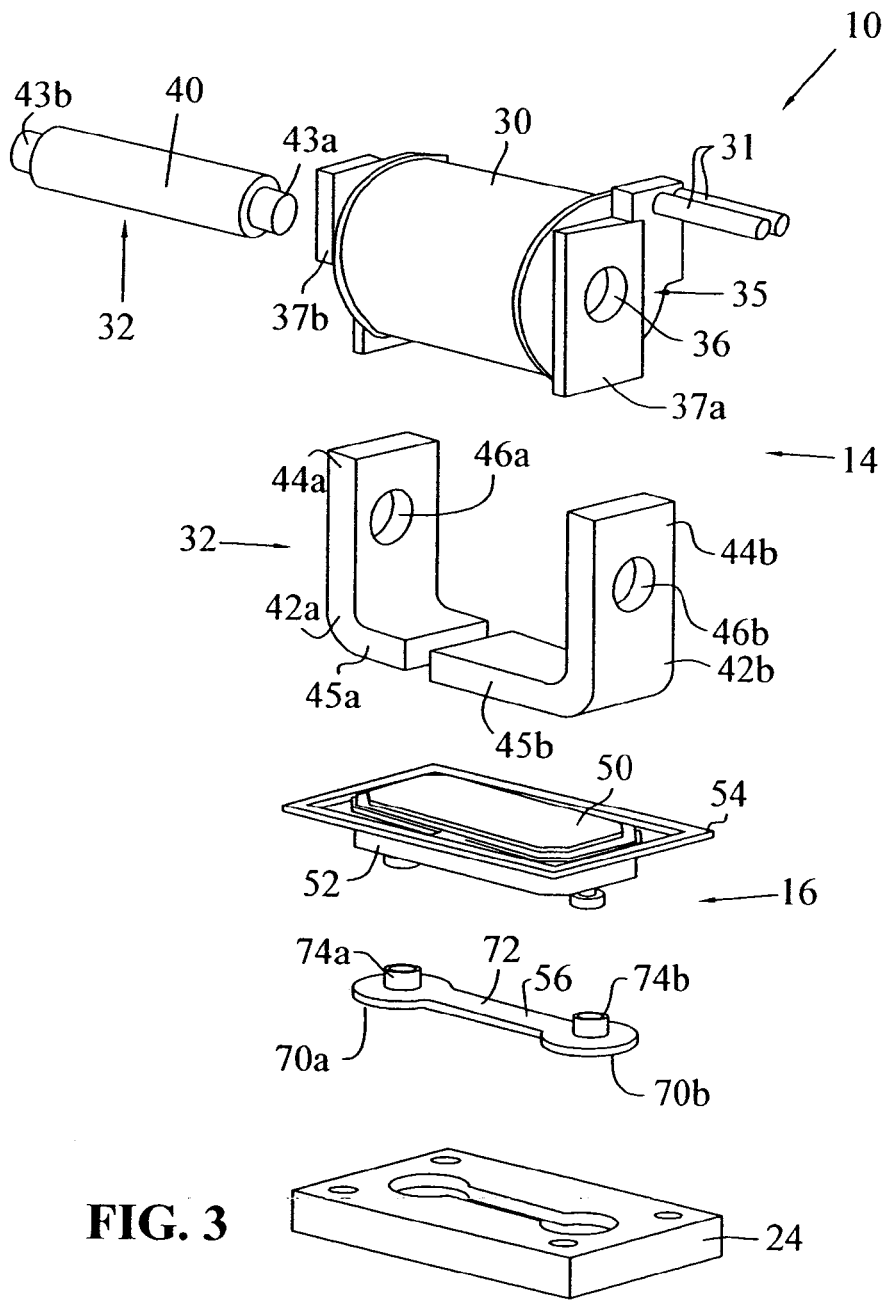
FIG. 3 is an exploded perspective view of FIG. 2.

The solenoid assembly 14 includes an electromagnetic coil 30, electrical leads 31 (FIG. 2), and a pole piece generally indicated as 32 for transferring a magnetic field generated by the coil to the toggle valve assembly 16. Electromagnetic coil 30 is of a standard design, as is well known to one skilled in the art, and is wound about a bobbin or spool generally indicated as 35 having a central through bore 36 and pair of outer flanges 37a, 37b (FIG. 3). The electrical leads 31 are connected to the electromagnetic coil 30 through the bobbin 35.

Pole piece 32 includes a central core portion 40 and a pair of legs 42a, 42b (FIGS. 3–5). The central core portion 40 has a generally cylindrical configuration in the embodiment shown and includes mounting spindles 43a, 43b. The legs 42a, 42b of pole piece 32 have a generally L-shaped configuration, wherein each leg includes a first length 44a, 44b, and a second length 45a, 45b, respectively. Each of the first lengths 44a, 44b include a hole 46a, 46b, respectively, for receipt of the respective mounting spindles 43a, 43b of central core portion 40. In this embodiment, both the first length 44a and the second length 45a of leg 42a are shorter than the respective first length 44b and second length 45b of leg 42b. In addition, in the embodiments shown, the second length 45b of leg 42b includes a pivot area 47 extending along the width of length 45b. Pole piece 32 also includes a bottom surface 48a on the second length 45a and bottom surfaces 48b and 48c on the second length 45b. Bottom surfaces 48b and 48c slope upward from the pivot area 47, and bottom surface 48a is sloped at the same inclination as bottom surface 48b. When the solenoid is assembled, there is a space 49 between the ends of lengths 45a, 45b.

The toggle valve assembly 16 of valve actuating apparatus 10 includes an armature 50 of a ferromagnetic material, an encapsulation medium 52, a spring 54, and a diaphragm 56. Armature 54 has a generally rectangular configuration and is predominantly enclosed on five sides with encapsulation medium 52. Encapsulation medium 52 may be made from any suitable material such as thermoplastic polyester resin like Rynite®, which is available from Dupont. In this embodiment, the encapsulation medium includes a pair of integrally formed poppets 58a, 58b extending from a bottom wall 59 of the encapsulation medium. In this embodiment, poppet 58a is longer than poppet 58b. Each of the poppets 58a, 58b, includes a head 60a, 60b, respectively.

Figure 7:
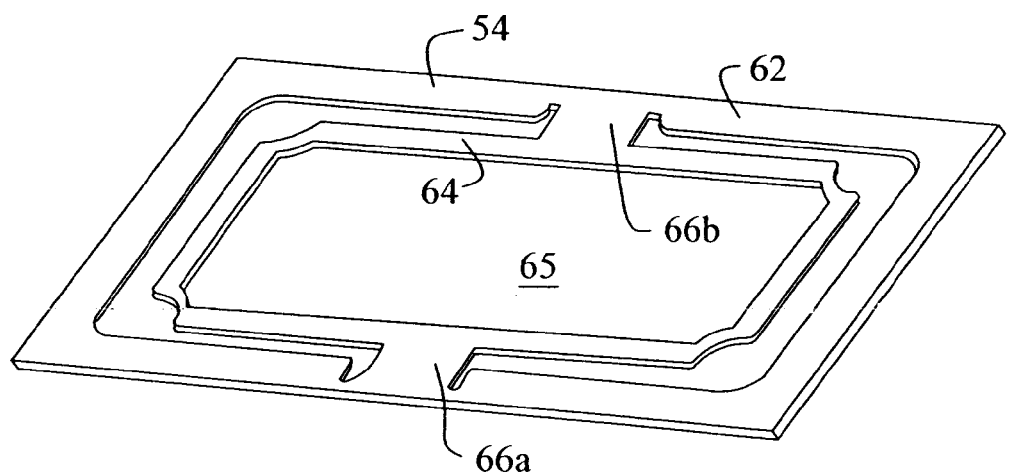
FIG. 7 is a perspective view of the spring member removed from the armature.

Now referring to FIG. 7, it can be seen that spring 54 includes an outer frame 62, an inner frame 64 having a central opening 65, and a pair of torsional force legs 66a, 66b connecting the inner frame to the outer frame. In this embodiment of spring 54, outer frame 62 and inner frame 64 each have a generally rectangular configuration, and the inner frame 64 is substantially concentric with the outer frame 62. Additionally, the frames can pivot relative to one another about torsional force legs 66a, 66b. Of course, as the frames are pivoted relative to one another a torsional force is built up in torsional force legs 66a, 66b, which tends to bias the spring back to the flat position of FIG. 7. Spring 54 may be made from a stainless steel alloy, as is well known, or other suitable spring material.

Diaphragm 56 is made from a suitable flexible material for sealing ports 27a and 27b and includes sealing surfaces 70a, 70b for mating with respective valve seats 28a, 28b (FIGS. 4 and 5). The diaphragm 56 also includes a connecting portion 72 and mounting cups 74a, 74b for mounting the diaphragm to respective heads 60a, 60b of poppets 58a, 58b.

When assembled as shown FIGS. 4 and 5, the solenoid assembly 14 is mounted primarily in cavity 25 of the upper portion 20 of housing 12 as discussed above. The central core portion 40 of the pole piece 32 is located in and extends through bore 36 of bobbin 35 with the mounting spindles 43a, 43b extending beyond the respective flanges 37a, 37b of the bobbin. The legs 42a, 42b of the pole piece are mounted to the central core portion 40 with mounting spindles 43a, 43b inserted in bores 46a, 46b of legs 42a, 42b, respectively. The second lengths 45a, 45b of the legs will be facing inward toward one another with the space 49 between the lengths.

Figure 6:
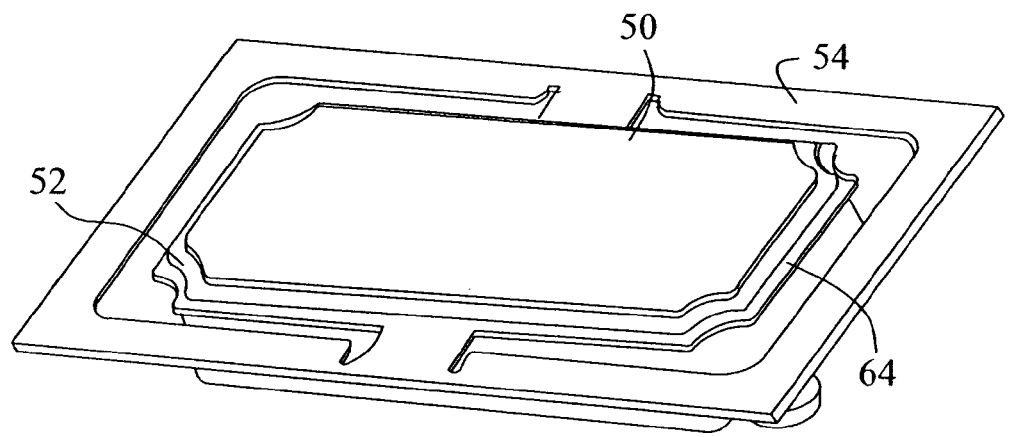
FIG. 6 is a perspective view of the armature, encapsulation medium, and spring member of the valve actuating apparatus.

The toggle valve assembly 16 is located predominately within the intermediate portion 22 of housing 12 as noted above. The inner frame 64 of spring 54 is mounted to the armature by being at least partially encased in the encapsulation medium 52 as shown in FIGS. 4–6. The spring is also mounted to housing 12 with the outer frame 62 held between the upper portion 20 and intermediate portion 22 of housing 12. The diaphragm 56 is mounted to the toggle valve assembly 16 by snapping mounting cups 74a, 74b on the heads 60a, 60b of poppets 58a, 58b, respectively. The ends of the diaphragm are held between intermediate portion 22 of the housing 12 and the valve body 24 to seal the toggle valve assembly and solenoid assembly from the fluid. When the parts are assembled as above, the housing may be held together with bolts or screws (not shown) screwed into mating threaded holes (not shown) extending through the housing parts. Of course, clamps or other suitable means may also be used to secure the assembly together.

In operation, the armature will assume a first position as shown in FIG. 4 when electromagnetic coil 30 is not energized and a second position as shown in FIG. 5 when the coil 30 is energized. In the non-energized first position, spring 54 will bias the armature so that the longer poppet 58a forces sealing surface 70a of diaphragm 56 against valve seat 28a of port 27a and so that the upper surface of the armature is against surface 48c of length 45b of the pole piece. In this position, port 27c, which serves as a common port, will be in open communication with port 27b through a passage 80a so that fluid may flow in either direction through ports 27b and 27c. Port 27a will be closed from fluid flow in this position since the sealing surface 70a is pressed against the valve seat 28a. Also, as can be seen in FIG. 4, in the first position, armature 50 is in contact with the second length 45b of leg 42b; however, an air gap 82 is present between the second length 45a of leg 42a and armature 50.

When the electromagnetic coil 30 is energized from electricity received through electrically leads 31, it will create a magnetic field, which will be transferred by pole piece 32 to armature 50. The magnetic field will pull armature 50 against the second length 45a of leg 42a as shown in FIG. 5 so that the air gap is eliminated and wherein the armature is in planar contact with bottom surfaces 48a and 48b of the pole piece. When moving to the position shown in FIG. 5, the armature will rotate and pivot about pivot area 47 of the second length 45b of leg 42b. The torsional force in torsional force legs 66a, 66b will be increased when the armature rotates in this manner. Also, while the armature 50 is in the second position, poppet 58a will have moved upward pulling sealing surface 70a of diaphragm 56 away from valve seat 28a. At the same time, the armature will force sealing surface 70b of diaphragm 56 through poppet 58b against valve seat 28b of port 27b. Accordingly, the common port 27c will now be in open communication with port 27a to allow fluid to pass therebetween through passage 80a.

When the coil is subsequently de-energized, the magnetic field in pole piece 32 holding the armature against leg 42a will be eliminated. The torsional force in the pivot legs 66a, 66b of spring 54 will then bias the armature back to the first position shown in FIG. 4, opening port 27b and closing port 27a.

An additional feature of the invention is the capability to achieve a proportional response or movement of the armature. Since the magnetic force, which is resisted by the toggle valve assembly 16 is proportional to the input current, it is possible to vary the current to achieve a variable force between the armature 50 and leg 42a of pole piece 32. This creates a proportional rotation of armature 50 resulting in a proportional orifice or opening between the diaphragm 56 and valve seats 28a or 28b of the valve body 24. Of course, the proportional opening will allow for proportional flow wherein the flow through the valves is proportional to the current passed through the coil. The proportional control is possible in any of the embodiments disclosed herein.

Figure 8:
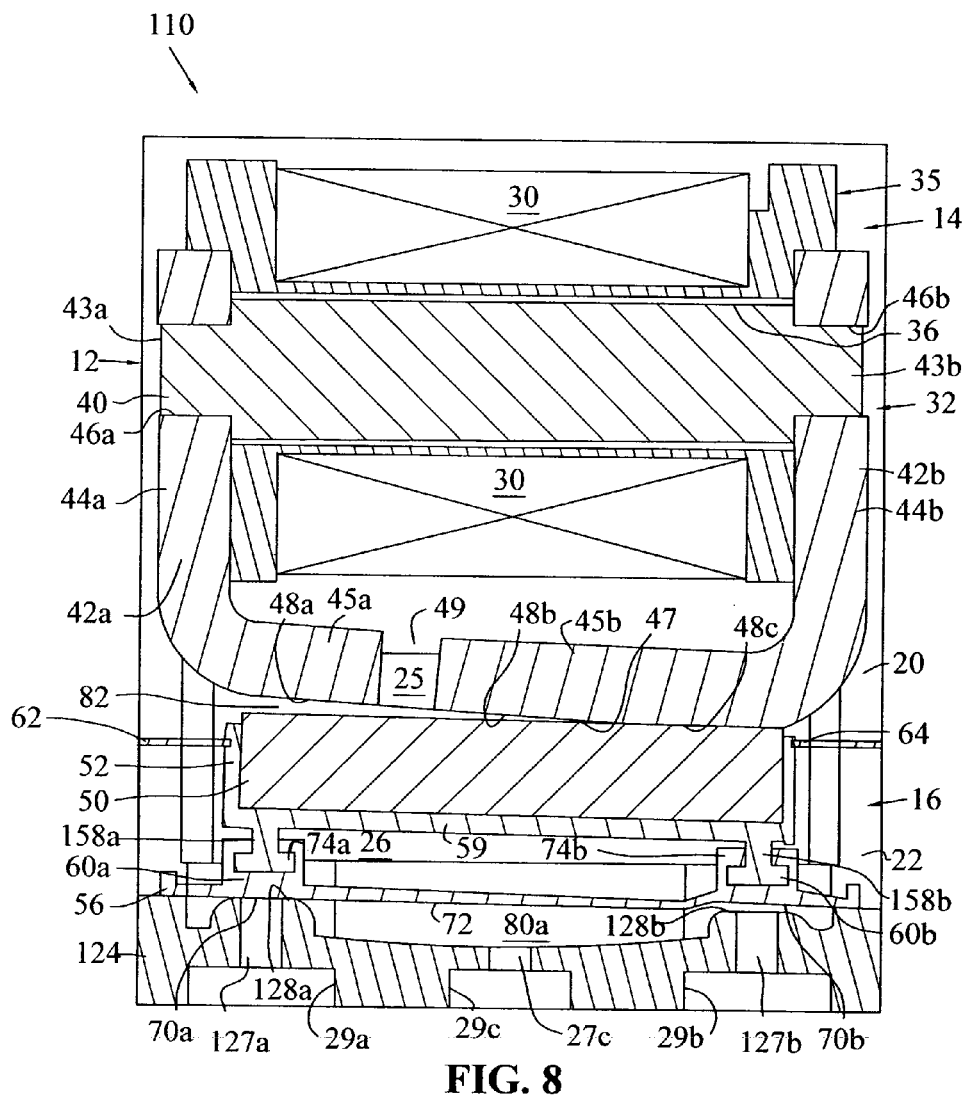
FIG. 8 is a cross-sectional view taken along the same plane as FIG. 4 showing a second embodiment of a valve actuating apparatus when the coil is not energized.
Figure 9:
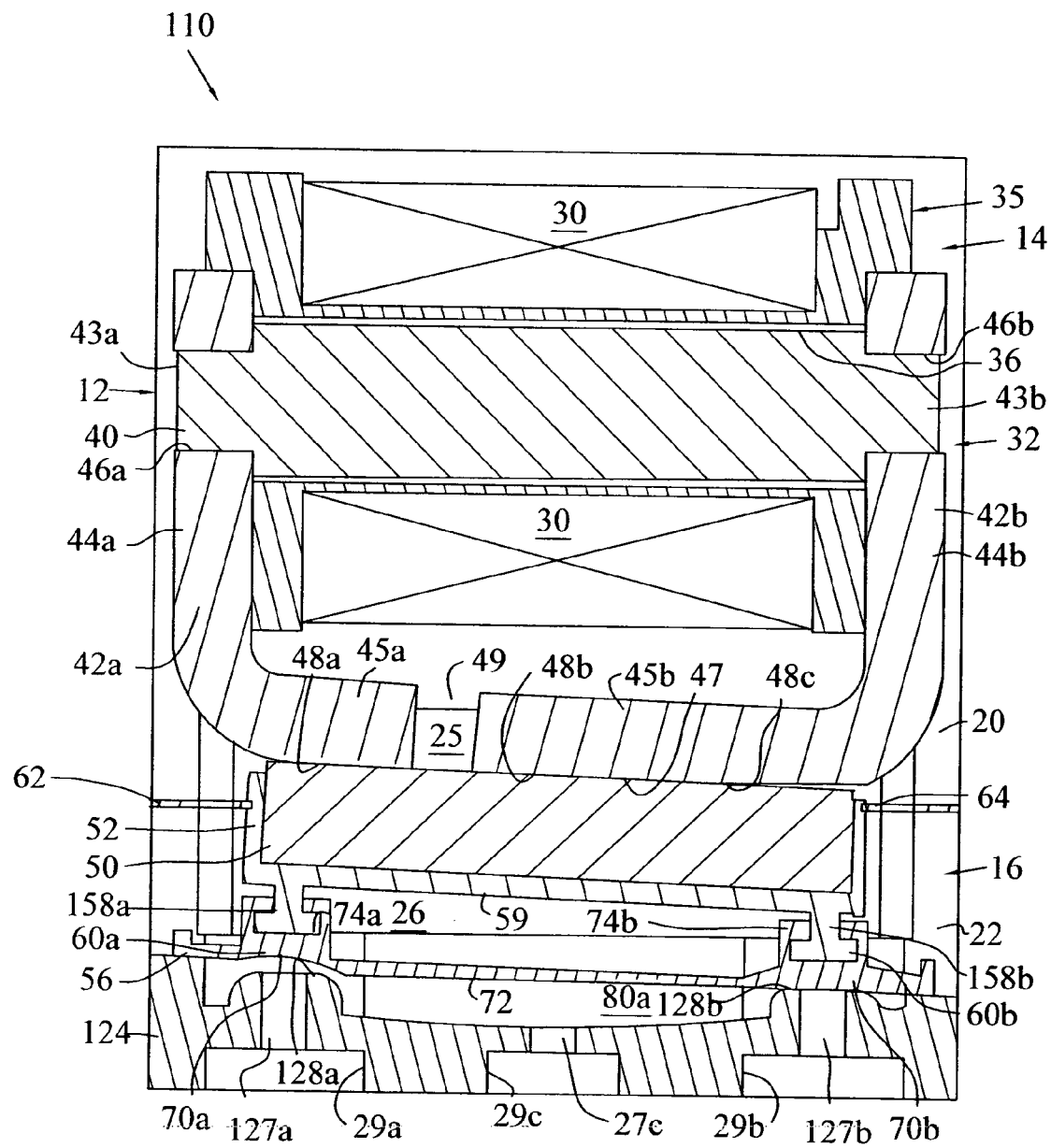
FIG. 9 is a cross-sectional view taken along the same plane as FIG. 4 showing the embodiment of FIG. 8 when the coil is energized.

An alternate embodiment valve actuating apparatus is shown generally indicated as 110 in FIGS. 8 and 9. Like numbers in the alternate embodiments represent like parts in FIGS. 1–7. In this embodiment, a valve body 124 of housing 12 includes ports 127a and 127b having respective valve seats 128a, 128b. Port 127a extends higher than port 127b, unlike ports 27a and 27b which are of equal height, so that valve seat 128a extends above the valve seat 128b. Also, the encapsulation medium 52 includes poppets 158a and 158b, which are of the same height in this embodiment unlike poppet 58a which is longer than poppet 58b. This embodiment is assembled and functions in the same manner as the previous embodiment.

Figure 10:
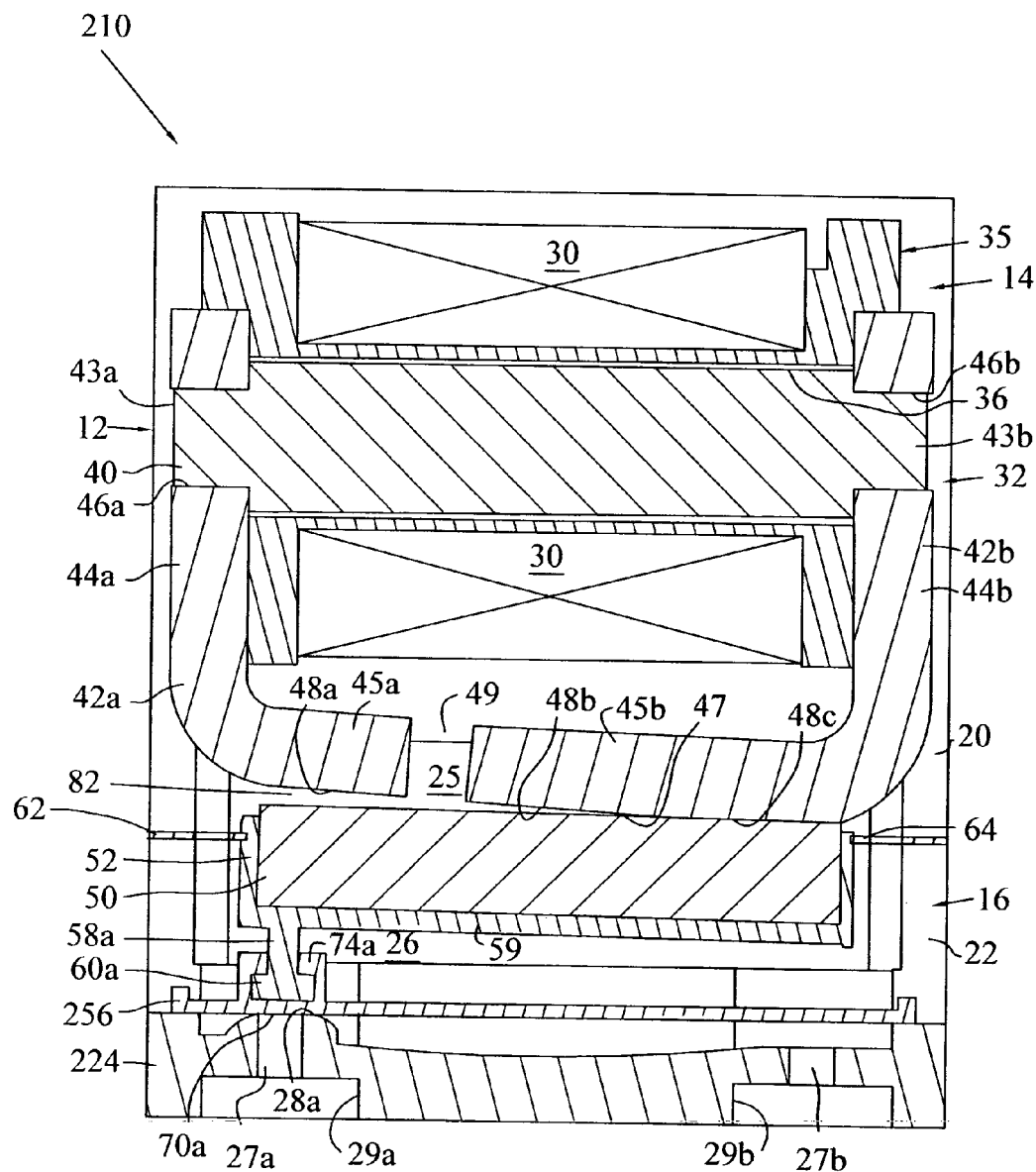
FIG. 10 is a cross-sectional view taken along the same plane as FIG. 4 showing a third embodiment of a valve actuating apparatus for a two-way valve when the coil is not energized.
Figure 11:
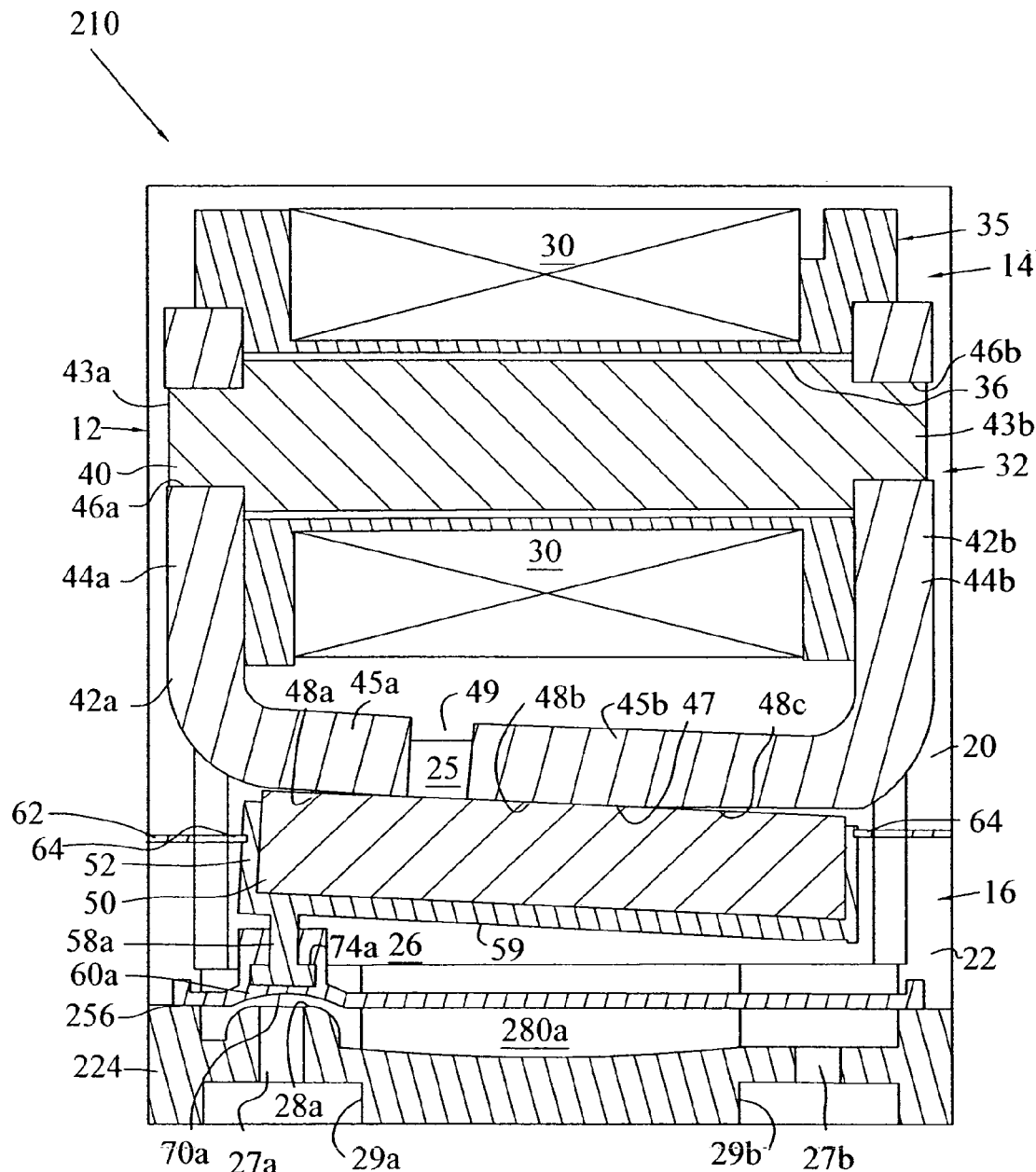
FIG. 11 is a cross-sectional view taken along the same plane as FIG. 4 showing the embodiment of FIG. 10 when the coil is energized.

Now referring to FIGS. 10 and 11, a third embodiment of a valve actuating apparatus is shown generally indicated as 210. Valve actuating apparatus 210 is a two-way valve having a valve body 224 in which the common port 27c has been eliminated. As such, this valve actuating apparatus will either allow or prevent fluid flow, as compared to the embodiments in FIGS. 1–9 in which the valve does not shut off fluid flow, but only directs whether the flow is through port 27a or 27b. To achieve the two-way valve, poppet 58b has been eliminated and a modified diaphragm 256 is used instead of diaphragm 56. In this embodiment, when the coil is not energized as shown in FIG. 10, spring 54 biases poppet 58a downward so that sealing surface 70a of diaphragm 256 is pressed against valve seat 28a closing off port 27a as with the first embodiment. However, since there is no common port, fluid is prevented from flowing through the valve in this position. When the electromagnetic coil 30 is energized as shown in FIG. 11, the armature pivots upward to contact leg 42a and thereby draws the sealing surface 70a away from valve seat 20a. At such time, fluid may then flow in either direction between ports 27a and 27b through a passage 280a as there is no poppet to close off port 27b.

Figure 12:
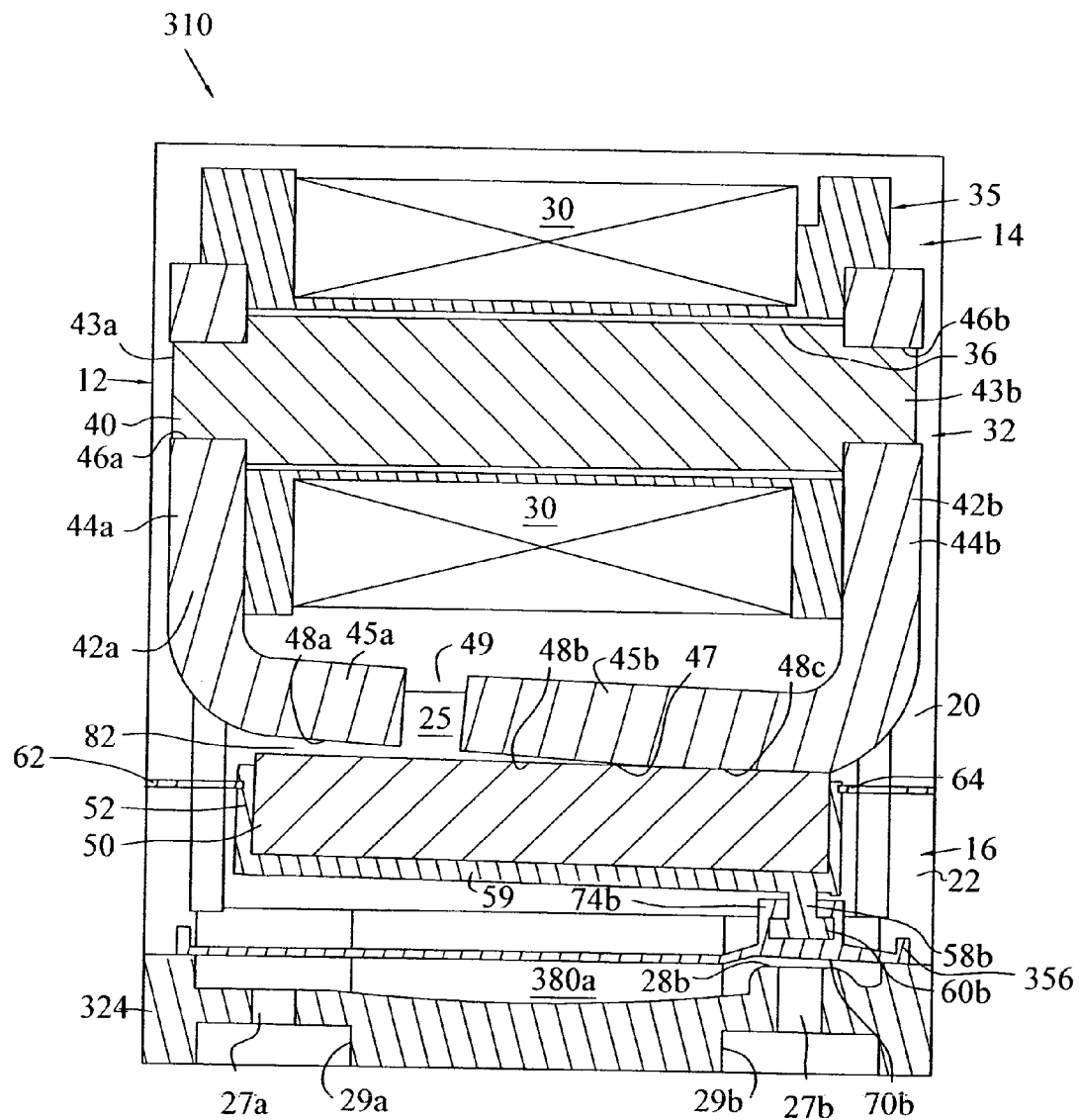
FIG. 12 is a cross-sectional view taken along the same plane as FIG. 4 showing a fourth embodiment of a valve actuating apparatus for another two-way valve when the coil is not energized.
Figure 13:
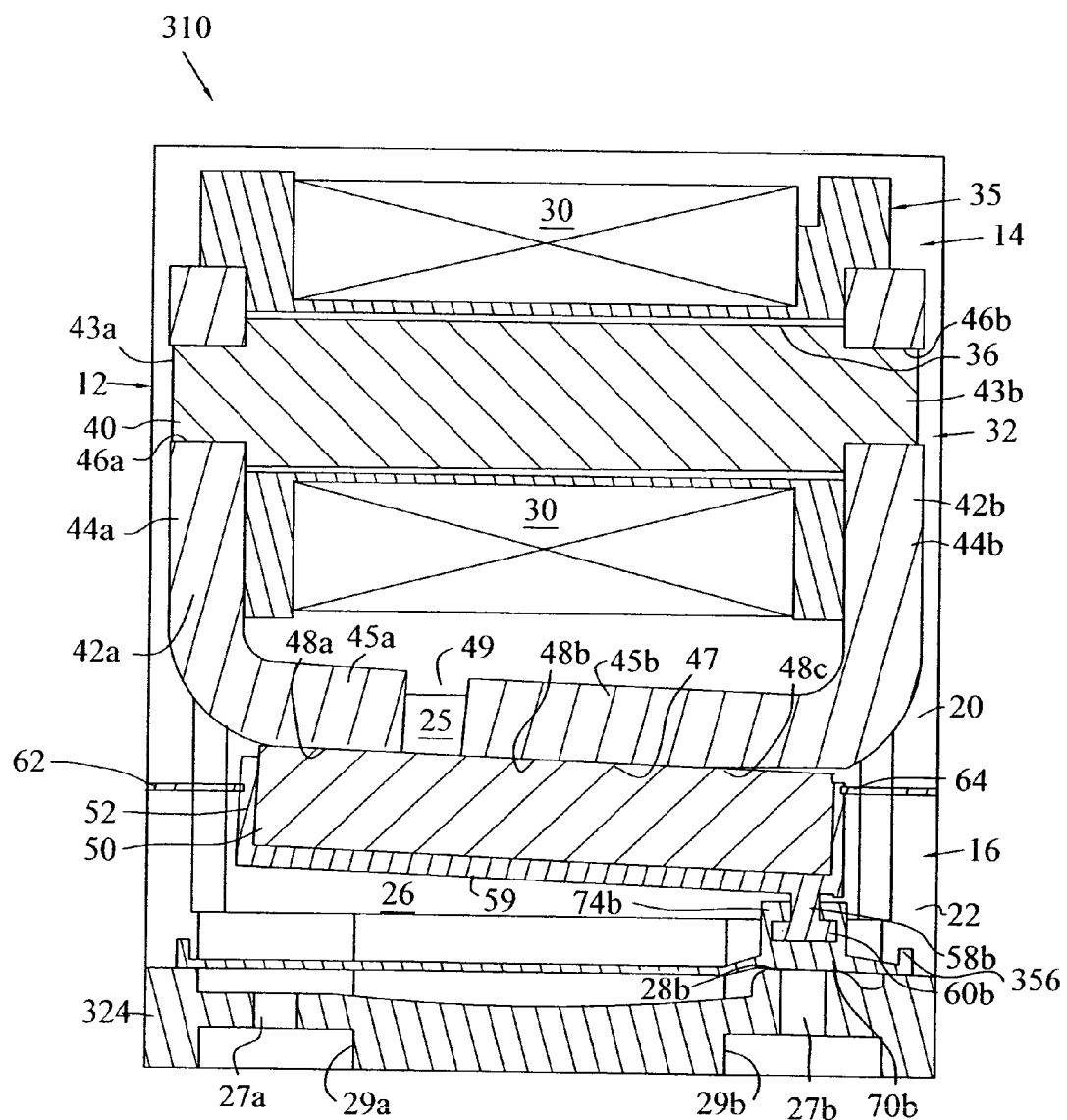
FIG. 13 is a cross-sectional view taken along the same plane as FIG. 4 showing the embodiment of FIG. 12 when the coil is energized.

Yet another embodiment of a valve actuating apparatus generally indicated as 310 is shown in FIGS. 12 and 13. This embodiment is similar to the embodiment of FIGS. 10 and 11, wherein the common port has been eliminated from a valve body 324, except that it conversely allows fluid to flow between ports 27a and 27b when the coil is not energized as shown in FIG. 12. Then, when the coil is energized as shown in FIG. 13, fluid flow is closed off. To accomplish this, poppet 58a has been eliminated so that in the normal state there is an open passage 380a between ports 27a and 27b. Then, when the coil is energized as shown in FIG. 13, the armature pivots about torsional force legs 66a and 66b so that poppet 58b pushes sealing surface 70b of a diaphragm 356 against valve seat 28b to close the fluid flow.

While the invention has been taught with specific reference to the above embodiments, one skilled in the art will recognize that changes can be made in form and detail without departing from the spirit and scope of the invention. For example, other springs may be substituted for the flat spring 54 such as coil springs. In addition, the spring may be manufactured from any suitable material other than a stainless steel alloy that provides the desired spring properties. Also, any suitable configuration may be used for the housing and the spring may be secured in a different manner. Additionally, any suitable shape may be used for the diaphragm, and the diaphragm made be made in two parts by eliminating the connecting portion. Also, the diaphragm may be attached in another suitable manner as opposed to the snap on design shown such as using an adhesive. It would also be possible to eliminate the diaphragm all together if the poppet is made of a material that provides a sufficient sealing surface against the valve seats.

It should also be appreciated that other configurations may be possible for a two-way valve wherein port 27c is maintained and either port 27a or 27b is eliminated. Of course, the design of the encapsulation medium 52 and diaphragm 56 may be altered as shown in FIGS. 10–13 or remain as shown in FIGS. 4–5 and 8–9 for the two-way valve. It should also be realized that the location of the common port 27c can be located anywhere in the valve body on either three-way or two-way valves so long as there is a path for fluid flow to ports 27a and/or 27b.

Additionally, other solenoid configurations may be used such as having the coil assembled in a vertical orientation. Other designs for the pole piece may also be used instead of the L-shaped legs. Alternately, the legs may have the second lengths connected to one another with a step providing the difference in height, or the second lengths may be connected and have a varying slope that facilitates the desired operation.

Also, the armature need not contact the pole piece. There may be an intervening part that does not interfere with the magnetic field, or there may be some small air gap remaining. In addition, when the coil is energized, the armature may pivot without coming into contact with leg 42a. The described embodiments are, therefore, to be considered in all respects only as illustrative and not restrictive. As such, the scope of the invention is indicated and limited only by the claims rather than by the description or drawings.

What is claimed is:

1. A valve actuating apparatus for control of fluid flow, including:
   a housing having a valve body with a first port and a second port;
   a toggle valve assembly including an armature at least one sealing surface connected to the armature, and a spring biasing the armature to a first position where the sealing surface closes the first port; and
   a solenoid assembly including an electromagnetic coil and a pole piece having a first leg and a second leg, the first leg being shorter than the second, the first leg and the armature defining an air gap when the armature is in the first position, and the electromagnetic coil creating a magnetic field in the pole piece when electrically energized to attract the armature toward the first leg to a second position wherein the air gap is reduced.

2. The valve actuating apparatus as set forth in claim 1, wherein when the armature is in the second position, the armature is in contact with the first leg of the pole portion.

3. The valve actuating apparatus as set forth in claim 1, wherein the second leg includes a pivot area on the bottom that the armature pivots about and sloping surfaces extending from the pivot area, and the toggle valve assembly includes a second sealing surface that closes the second port when the armature is in the second position.

4. The valve actuating apparatus as set forth in claim 3, including a proportional control allowing proportional fluid flow through the ports, and the first sealing surface moves away from and opens the first port when the armature moves to the second position.

5. The valve actuating apparatus as set forth in claim 1, further including a common port in communication with the second port when the armature is in the first position and in communication with the first port when the armature is in the second position.

6. The valve actuating apparatus as set forth in claim 1, wherein the armature is at least partially enclosed in an encapsulation medium.

7. The valve actuating apparatus as set forth in claim 6, wherein the encapsulation medium includes a pair of integrally formed poppets.

8. The valve actuating apparatus as set forth in claim 7, wherein one of the poppets is longer than the other, and the longer poppet closes the first port when the armature is in the first position.

9. The valve actuating apparatus as set forth in claim 8, further including a diaphragm mounted to the poppets, and the diaphragm forms the sealing surface.

10. The valve actuating apparatus as set forth in claim 6, wherein the spring is at least partially encased by the encapsulation medium.

11. The valve actuating apparatus as set forth in claim 1, wherein the spring includes a pair of torsional force legs.

12. The valve actuating apparatus as set forth in claim 11, wherein the spring includes a frame extending from the torsional force legs for mounting the spring to the housing, and the armature pivots about a pivot area on the second leg.

13. A valve actuating apparatus for control of fluid flow, including:
- a housing having a valve body with a first port and a second port;
- a toggle valve assembly including an armature, a first and second poppets connected to and extending from the armature, the first poppet being longer than the second poppet, a diaphragm mounted to at least one of the poppets to provide sealing surfaces against valve seats on the ports, and a spring biasing the armature to a first position such that the first poppet closes the first port; and
- a solenoid assembly including an electromagnetic coil and a pole piece, the electromagnetic coil creating a magnetic field in the pole piece when electrically energized to attract the armature to a second position wherein the first port is open and the second port is closed.

14. The valve actuating apparatus as set forth in claim 13, wherein the second poppet closes the second port in the second position.

15. The valve actuating apparatus as set forth in claim 13, further including a common port in communication with the second port when the armature is in the first position and in communication with the first port when the armature is in the second position.

16. The valve actuating apparatus as set forth in claim 13, wherein the armature is at least a partially enclosed in an encapsulation medium, and the poppets are formed in the encapsulation medium.

17. The valve actuating apparatus as set forth in claim 16, wherein the spring includes torsional force legs and at least a portion of the spring is encased by the encapsulation medium.

18. The valve actuating apparatus as set forth in claim 17, wherein the spring includes a frame extending from the torsional force legs for securing the spring to the housing.

19. The valve actuating apparatus as set forth in claim 13, wherein the armature and the first leg of the pole piece define an air gap when the armature is in the first position, and the air gap is reduced when the coil is energized.

20. A valve actuating apparatus for control of fluid flow, including:
- a housing having a valve body with a first port and a second port;
- a toggle valve assembly including an armature, a spring having legs extending outwardly from the armature and an encapsulation medium enclosing at least a portion of the armature and the spring, the spring providing a torsional force to bias the armature to a first position wherein the first port is closed; and
- a solenoid assembly including an electromagnetic coil and a pole piece, the electromagnetic coil creating a magnetic field in the pole piece when electrically energized to attract the armature to a second position in which the first port is open.

21. The valve actuating apparatus as set forth in claim 20, wherein the encapsulation medium includes a pair of integrally formed poppets, the first poppet being longer than the second poppet.

22. The valve actuating apparatus as set forth in claim 21, including proportional control to allow proportional fluid flow through the parts and wherein the first poppet closes the first port in the first position.

23. The valve actuating apparatus as set forth in claim 22, further including a diaphragm mounted to at least one of the poppets to provide a sealing surface against a valve seat of one of the ports.

24. The valve actuating apparatus as set forth in claim 20, wherein the spring is made of metal and includes a frame to secure the spring to the housing.

25. The valve actuating apparatus as set forth in claim 20, wherein the pole piece includes a first leg and a second leg, the first leg being shorter than the second.

26. The valve actuating apparatus as set forth in claim 25, wherein the armature and the first leg define an air gap when the armature is in the first position.

27. The valve actuating apparatus as set forth in claim 26, wherein the air gap is reduced when the armature moves to the second position as the coil is energized.

28. A valve actuating apparatus for controlling fluid flow, including:
- a housing including a valve body having a first port and a second port;
- a toggle valve assembly including an armature, the armature being moveable between a first position and a second position, wherein when the armature is in the first position, the first port is closed, and when the armature is in the second position, the first port is open;
- a solenoid assembly including an electromagnetic coil and a pole piece, the pole piece including a central portion located inside the coil and a pair of legs extending from the central portion, one of the legs being shorter than the other, the armature contacting only one of the legs while in the first position and contacting both of the legs while in the second position.

29. The valve actuating apparatus as set forth in claim 28, wherein the one leg that the armature contacts in the first position includes a pivot area that the armature pivots about and sloping surfaces extending away from the pivot area.

30. The valve actuating apparatus as set forth in claim 29, wherein the shorter leg of the pole piece has a sloping bottom surface at the same inclination as one of the sloping surfaces extending from the pivot area.

31. The valve actuating apparatus as set forth in claim 28, further including proportional control with a variable magnetic force between the pole piece and the armature to provide proportional fluid flow through the ports.

32. The valve actuating apparatus as set forth in claim 13, wherein the first poppet extends further from the armature than the second poppet in a direction generally perpendicular to the armature.

33. A valve actuating apparatus for control of fluid flow, including:
- a housing having a valve body with a first port and a second port;
- a toggle valve assembly including an armature having an off-center pivot axis, first and second poppets connected to and extending from the armature, the first poppet being longer than the second poppet, and the second poppet being closer to the pivot axis than the first poppet, and a spring biasing the armature to a first position such that the first poppet closes the first port; and a solenoid assembly including an electromagnetic coil and a pole piece, the electromagnetic coil creating a magnetic field in the pole piece when electrically energized to attract the armature to a second position wherein the first port is open and the second port is closed.

34. A valve actuating apparatus for control of fluid flow, including:
- a housing having a valve body with a first port and a second port;
- a toggle valve assembly including an armature, first and second poppets connected to and extending from the armature, the first poppet being longer than the second poppet, and a spring biasing the armature to a first position such that the first poppet closes the first port; and
- a solenoid assembly including an electromagnetic coil and a pole piece, the pole piece including a first leg and a second leg, the first leg being shorter than the second leg, wherein the longitudinal length of the first leg is shorter than the longitudinal length of the second leg along respective longitudinal lengths thereof, the legs straddling the electromagnetic coil and creating a magnetic field in the pole piece when electrically energized to attract the armature to a second position wherein the first port is open and the second port is closed.

* * * * *